United States Patent [19]
Walter et al.

[11] Patent Number: 5,167,254
[45] Date of Patent: Dec. 1, 1992

[54] ADSORBER SWITCHING VALVE

[75] Inventors: Daniel C. Walter, Chardon; Robert N. Schmidt, Cleveland, both of Ohio

[73] Assignee: The United States of America as represented by the Secretary of the Army, Washington, D.C.

[21] Appl. No.: 690,193

[22] Filed: Apr. 23, 1991

[51] Int. Cl.$^5$ ............................................. F16K 11/02
[52] U.S. Cl. .............................. 137/595; 137/625.43; 137/862
[58] Field of Search ............... 137/861, 625.43, 596.15, 137/596.18, 597, 595, 862, 865, 637, 869

[56] References Cited

U.S. PATENT DOCUMENTS

| | | | |
|---|---|---|---|
| 3,964,517 | 6/1976 | Dickenson | 137/625.43 |
| 4,445,540 | 5/1984 | Baron et al. | 137/625.43 |
| 4,460,017 | 7/1984 | Robb | 137/625.43 |
| 4,466,457 | 8/1984 | Brane et al. | 137/625.43 X |
| 4,543,996 | 10/1985 | Baron | 137/625.43 |
| 4,653,537 | 3/1987 | Voith | 137/625.43 |
| 4,774,977 | 10/1988 | Cohen | 137/625.43 X |

Primary Examiner—Martin P. Schwadron
Assistant Examiner—Kevin L. Lee
Attorney, Agent, or Firm—Anthony T. Lane; Edward Goldberg; Michael C. Sachs

[57] ABSTRACT

An apparatus for controlling the flow of fluid, comprising an 8-way switching valve for directing an inlet stream of air to one of multiple adsorber beds and then to the crew compartment of an air-tight vehicle while simultaneously directing an outlet stream of air to another adsorber bed and then to the atmosphere, whereby the inlet stream may be purified by adsorption on one bed while the other bed is regenerated. The fluid is directed by passageways in rotatable valve spools axially colinearly aligned, connected together so as to rotate simultaneously, and having ports aligned with openings in a sealed valve housing which communicate with inlet and outlet piping and absorber bed piping. Rotating the valve spool aligns various configurations of passageways and piping so as to direct the streams to different beds. The valve spools may be contained in separate housings for safety, avoiding cross contamination during switching. Because all the valve spools are driven by a single drive shaft, all bed inlet and outlet lines are switched simultaneously, providing safe operation and decreasing control logic requirements as well as weight, power and volume requirements.

22 Claims, 4 Drawing Sheets 5,167,254

ADSORBER SWITCHING VALVE

GOVERNMENTAL INTEREST

The Government has rights in this invention pursuant to Contract No. DAAK-11-81-C-0028 awarded by the Department of the Army.

BACKGROUND OF THE INVENTION

This invention relates generally to multi-line switching valves. Protection of combat vehicle crews against chemical warfare agents requires that air entering the vehicle be purified before it enters the crew compartment. Present technology utilizes Whetlerite charcoal to purify the air by adsorption. The Whetlerite charcoal process has numerous disadvantages. One of the most significant of these is that the charcoal bed must be replaced when the charcoal becomes saturated. This places a great logistical burden on military supply lines. To reduce this burden, regenerative air purification technologies have been developed using multiple adsorber beds. Air entering the vehicle is purified by one adsorber bed while other adsorber beds are being regenerated by outgassing by heating or pressure differential techniques. As each bed becomes saturated, a switching valve switches the flow of air to a fresh bed, at the same time switching the contaminated bed to an outlet line in a regeneration configuration. The leading regenerable purification technologies are of the class called regenerative adsorption technologies which include temperature swing adsorption and pressure swing adsorption. Temperature swing adsorption, utilizing below ambient temperatures, is presently a leading technology for advanced collective protection systems for military vehicles.

A problem with regenerative adsorption systems is that they have complicated valving arrangements. A two-bed system requires four valves on the inlet side. These valves allow the inlet process stream to be directed to the proper bed while shutting off the regeneration back flush outlet line. It is known in the art to provide four shutoff valves at the outlet and to simplify the system by utilizing four check valves. An arrangement using two four-way valves is the previous best state-of-the-art. However, controls are still needed to coordinate the action of the two valves. In such a two-valve system, the two valves must act simultaneously to maintain a flow of purified air to the crew compartment. Failure of the two valves to act simultaneously may result in the death of the crew. The objective of the present invention is to remove this safety hazard by providing one multiple switching valve which switches all the bed inlet and outlet lines simultaneously. This significantly increases safety and reliability while decreasing the complexity of the required control logic. It may also reduce the overall weight, power and volume requirements.

SUMMARY OF THE INVENTION

It is therefore a principal object of this invention to provide an 8-way switching valve that is capable of handling bed inlet and outlet air streams with a single valve that switches all the lines simultaneously.

Another object of the invention is to provide a switching valve that is more reliable and therefore safer in operation than previously available valves.

A further object of the invention is to decrease the complexity of the controls necessary to operate the switching system.

A still further object of the invention is to reduce the weight, power and volume requirements of the valve system.

DESCRIPTION OF THE PREFERRED EMBODIMENT

Figure 1:
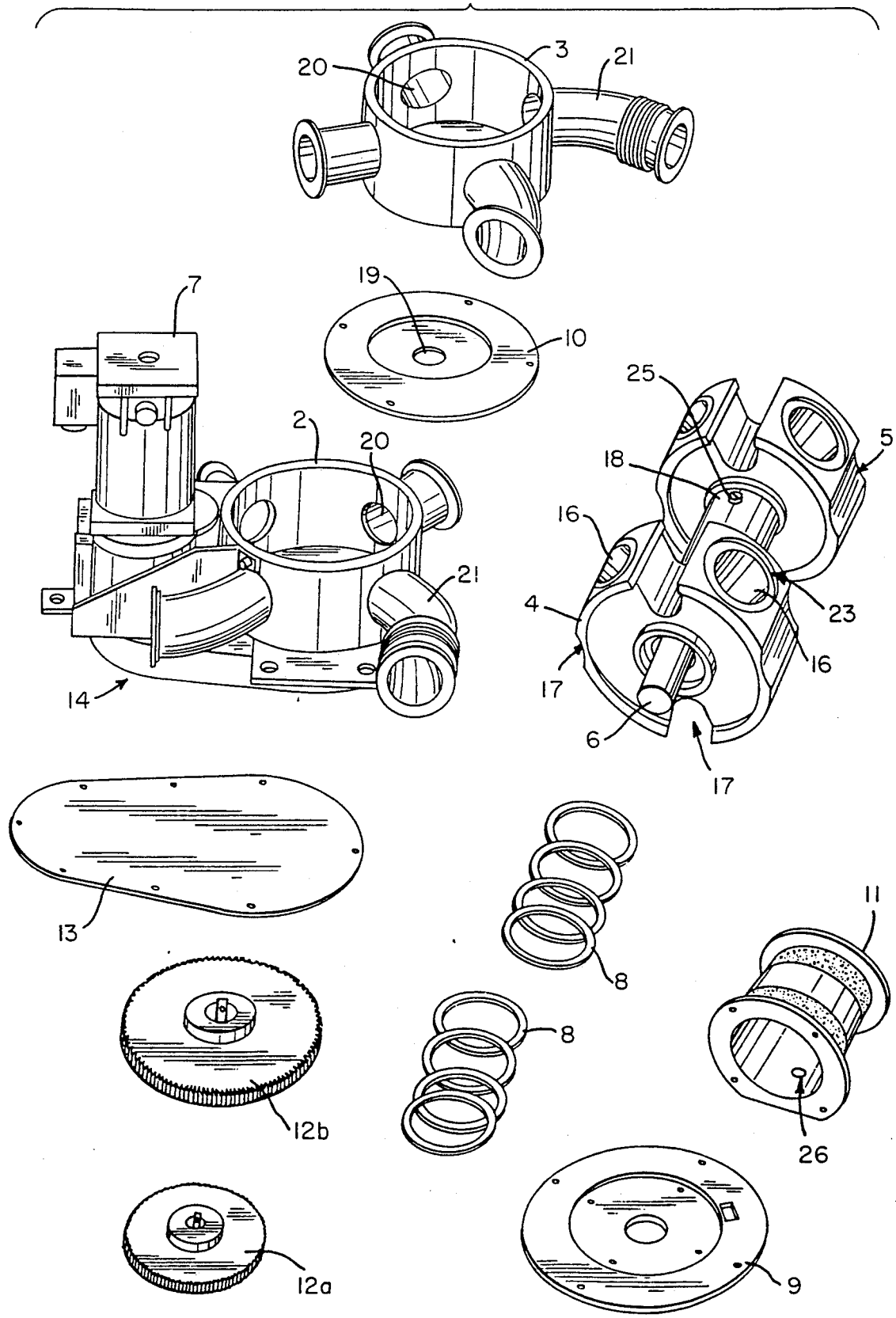
FIG. 1 is an exploded view of the preferred embodiment of the adsorber switching valve according to the present invention.

Referring to FIG. 1, the adsorber switching valve in its preferred embodiment comprises two valve housings 2, 3, two valve spools 4, 5, colinearly axially disposed with respect to each other, a spool drive shaft 6 having an upper end and a lower end, axially disposed with respect to the valve spools 4, 5; a drive mechanism 7 having a drive shaft, not shown, sealing means 8 and a valve position sensing means, not shown. The driving mechanism may be a high torque 28 VDC motor. Cover plates 9, 10 close off the housings. A valve spool separator 11 is interposed between the cover plates 9, 10 and axially disposed with respect to the spool drive shaft 6. The valve spools 4, 5 are fixed to the spool drive shaft 6. Gears 12a, 12b rotatably mesh with each other. Gear 12a is mounted on the drive shaft of the drive mechanism 7. Gear 12b is axially mounted on the lower end of the spool drive shaft 6. Operation of the drive mechanism 7 rotates the spool drive shaft 6 axially through the action of the gears 12a, 12b, rotating the valve spools 4, 5. The gears are covered by a gear cover plate 13 and a motor frame/gear housing 14.

The valve spools 4, 5 contain through ports 16, circular in cross section. The through ports 16 are passageways for fluid, the fluid being air when the invention is used in the preferred embodiment. Each passageway through a valve spool 4, 5 makes a right-angle turn in direction through the valve spool 4 or 5 and opens out of the valve spool at a point 90 degrees around the circumference of the valve spool. The through ports 16 are preferentially made to the full bore dimension of the openings 20 on the valve housing 2, 3, that is, the through ports 16 and the openings 20 are of the same shape and cross sectional area throughout, so as to minimize pressure drop. Notches 17 may be fabricated into the valve spools 4, 5 to reduce weight. The openings 20 on the valve housings 2, 3 are located opposite the locations of the through ports 16 in the valve spools 4, 5. A quarter turn of the valve spools 4, 5 switches each through port 16 to a position aligned opposite an opening 20 located one quarter of the way cicumferentially around the housing 2, 3. The openings 20 in the housing 2, 3 communicate to piping 21 leading to the adsorber beds, not shown, and to inlet and outlet piping, also not shown. The piping may contain flexible parts or bellows to compensate for thermal expansion.

The two-bed system has four inlet streams and four outlet streams. Each spool has two inlets and two outlets. The top spool, 5, processes contaminated air. Its first inlet takes in the outside air. Its outlet goes to one of the adsorber beds. Its second inlet takes the contaminated air from the other adsorber bed and discharges that air to outside the vehicle. Thus, spool 5 processes contaminated air. At the same time, the bottom spool, 4, is configured so that its first inlet takes air from the adsorber bed and sends it to the crew compartment and the regeneration heater. The second inlet of spool 4 takes air from the regeneration air heater and sends it to the other adsorber bed. This air is used to regenerate the second bed. In this configuration Bed One purifies the inlet air while Bed Two is being regenerated. When Bed One reaches saturation, the valve spools are rotated 90 degrees to a second position in which the inlet stream is now directed to Bed Two and then to the crew compartment while the outlet stream is directed to Bed One and then to the atmosphere. In this second configuration Bed Two purifies the inlet air while Bed One is being regenerated.

The collinear axial spool drive shaft 6 connects the valve spools 4, 5. Bearings 19 are preferentially located at every point where the spool drive shaft 6 is supported at the valve housing 2, 3 or the valve housing cover plates 9, 10. The spool drive shaft 6 may be a single piece or, for ease of assembly, may be made of multiple pieces connected by couplings. One such coupling may be a flexible shaft 18 as shown in FIG. 1. The flexibility of the shaft reduces the starting torque necessary to turn the valve and compensates for slight misalignment of the valve spools 4, 5, thus avoiding excess bearing 19 wear. A shear key, not shown, is provided at the connection between the spool drive shaft 6 and the drive mechanism 7. The spool drive shaft 6 is fastened to the flexible shaft 18 by a set screw 25. A hole 26 appropriately located in the valve spool separator 11 allows access to the set. screw 25 for screwdriving means.

The junction between the through ports 16 and the openings 20 are sealed by sealing means comprising 0-rings 8 mounted in 0-ring grooves 23 in the valve spools in the preferred embodiment. The 0-rings should be 70 durometer or higher.

The valve housings 2, 3 and valve spools 4, 5 may be fabricated of stainless steel or any other suitable metal, plastic, or chemically resistant material. For use with high regeneration temperatures the valve housings 2, 3 and valve spools 4, 5 may be fabricated from or coated with Polytetrafluoroethylene (PTFE).

RIG. 4 shows an exterior view of the assembled switching valve.

FURTHER EMBODIMENTS OF THE INVENTION

Figure 2:
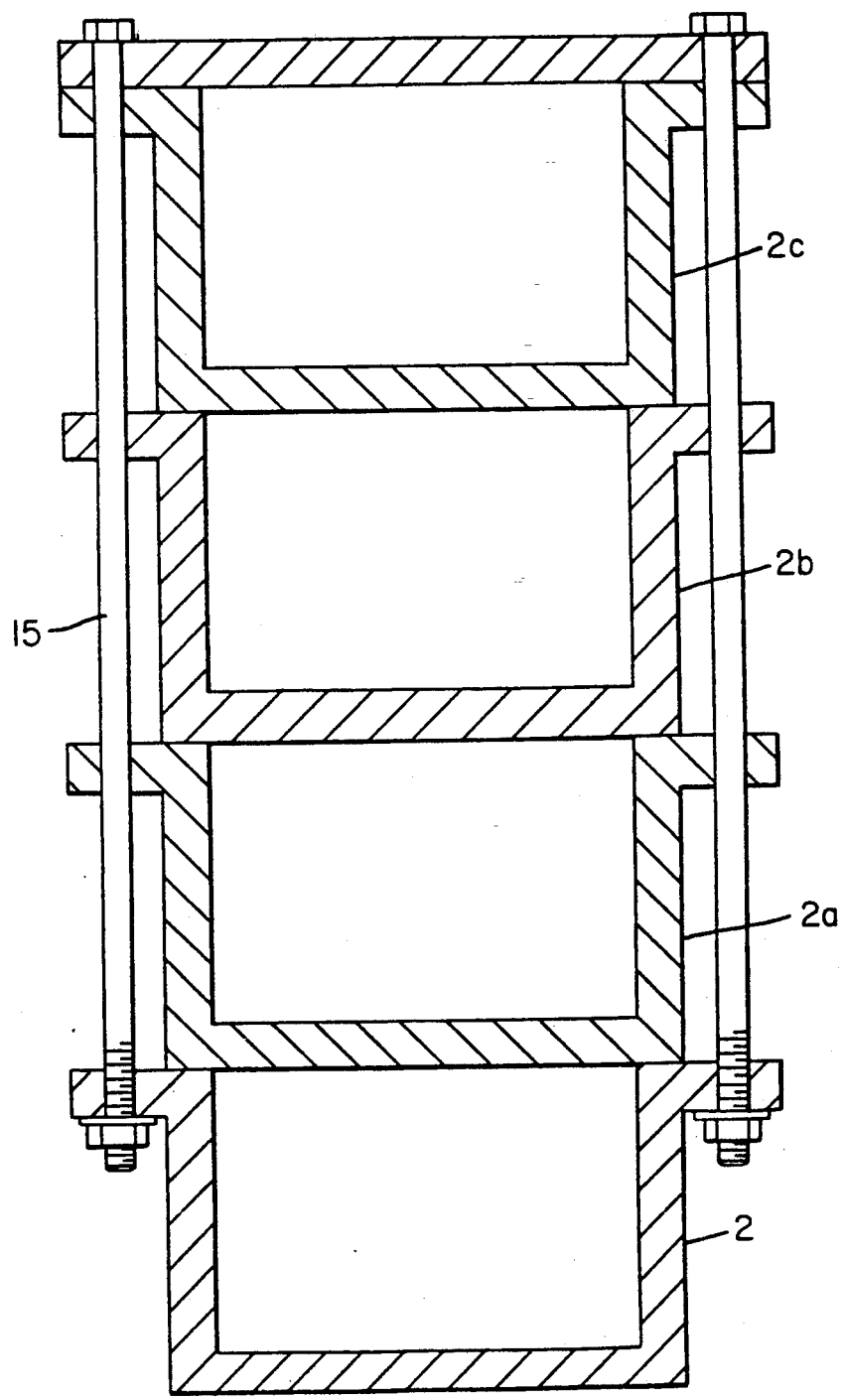
FIG. 2 is a sectional view of a second embodiment of the invention in which several valve housings are stacked.

Multiple valve housings 2, 2a, 2b, 2c may be stacked one next to another as shown in FIG. 2 and fastened in place with through bolts 15 or other fastening means. This provides maximum economy of space for a multiple spool valve when using multiple beds.

Figure 3:
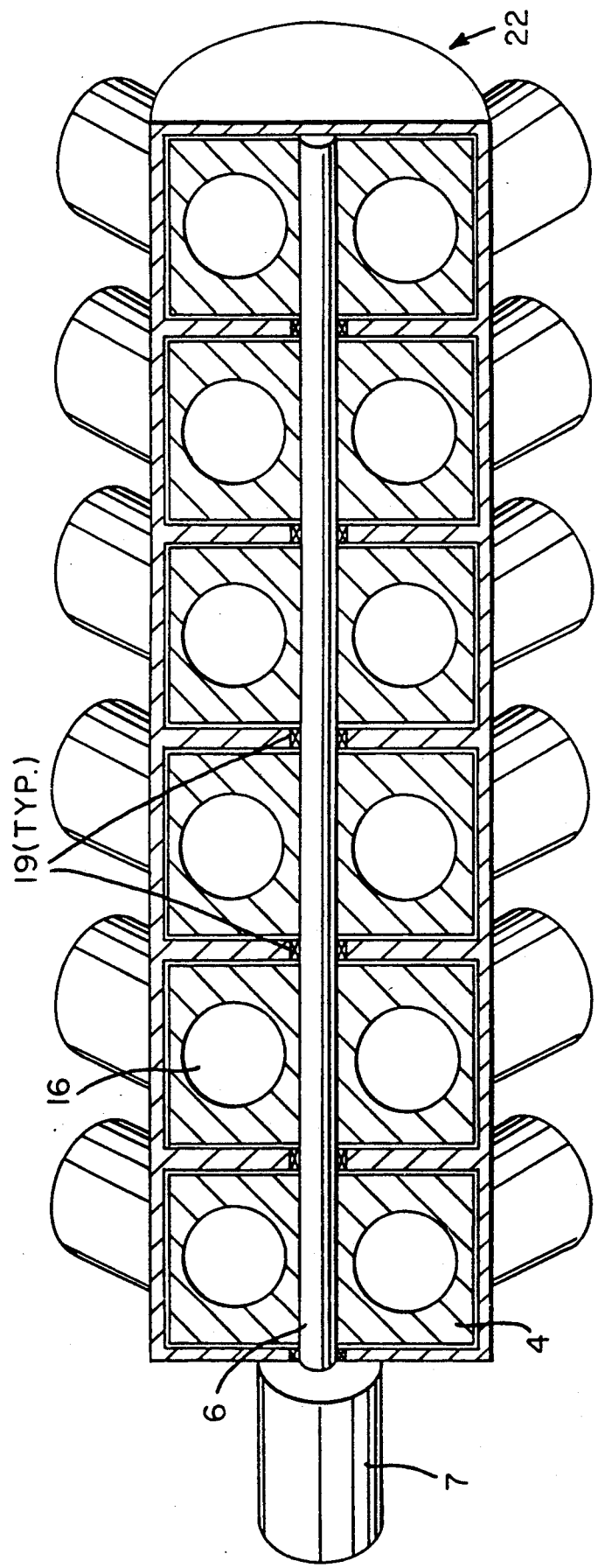
FIG. 3 is a sectional view of a third embodiment of the invention in which the valve housing is split.
Figure 4:
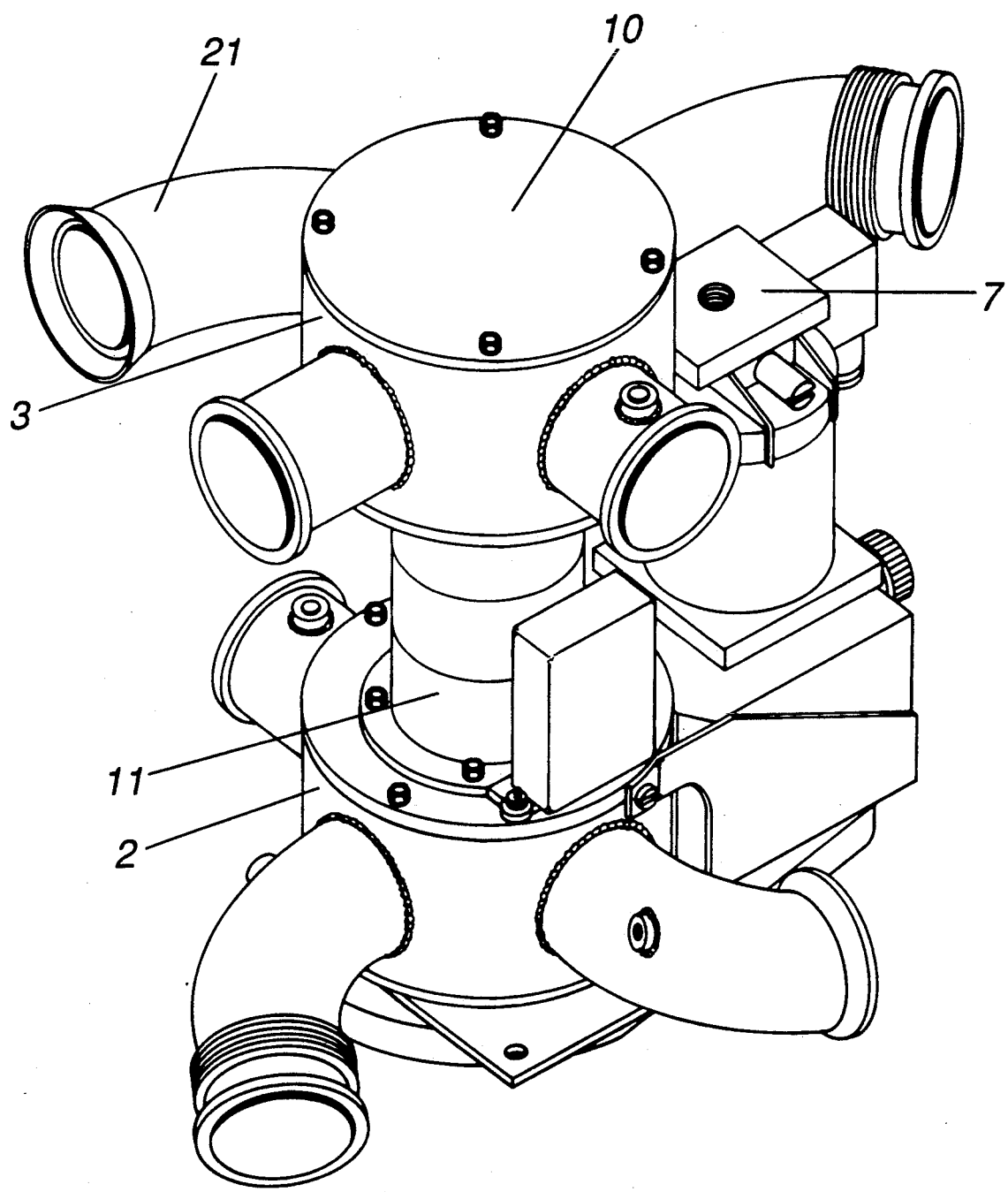
FIG. 4 is an isometric view of the assembled switching valve.

An alternative multi-spool design comprises a multispool split housing 22 as shown in FIG. 3. The split housing 22 would be utilized for six adsorption beds. However, an advantage of separating the valve housings in the manner shown in FIG. 1 as opposed to stacking the housings as shown in FIGS. 2 and 3, is that spatially separating the housings as in FIG. 1 provides absolute protection against cross contamination when the valve spools rotate. It also provides protection against contamination in the event of seal failure in the housings. This absolute protection is obtained as long as all spools are operating above ambient pressure.

Another way of minimizing cross contamination is by venting each housing 2, 3 to the atmosphere. For industrial uses, where hazardous gases or liquids are being handled, the vents may be piped either to a safe location or to a flare line or other safe collection point.

The spool drive shaft may be directly coupled to the drive mechanism instead of being driven through gears. A brake may be provided to assist the stopping of the valve spool rotation.

Although the preferred embodiment of this invention has been described in detail it is recognized that the invention is not limited to the precise form and structure described and various modifications and rearrangements as will occur to those skilled in the art upon full comprehension of this invention may be resorted to without departing from the scope of the invention as defined in the claims.

What we claim is:

1. A switching valve for directing inlet and outlet streams of air to multiple destinations, comprising a plurality of valve housings each enclosing a valve spool cylindrical in shape, said spools being colinearly and axially disposed with respect to each other, said valve spools having within them multiple passageways for fluid, each passageway terminating in two through ports on the cylindrical surface of said valve spool; a spool drive shaft colinearly axially disposed with respect to said valve spools and connecting said spools; openings in said valve housings located opposite the through ports in the valve spools, said openings communicating to piping to the destinations and to inlet and outlet piping; driving means for rotating said spool drive shaft, thereby rotating all the valve spools simultaneously; means for sealing the valve housings.

2. An adsorber switching valve according to claim 1, wherein each valve spool has two passageways, each passageway connecting two through ports located at 90 degrees to one another circumferentially on the cylindrical surface of the valve spool.

3. An adsorber switching valve according to claim 2, wherein each valve spool is notched at locations between the passageway to reduce the weight of the spool.

4. An adsorber switching valve of claim 2, wherein the valve spools and valve housing are fabricated of stainless steel.

5. An adsorber switching valve according to claim 2, wherein the valve spools are fabricated of or coated with Polytetrafluoroethylene.

6. An adsorber switching valve according to claim 2, wherein all the through ports on the valve spools and all the openings in the valve housings are of the same shape and cross sectional area.

7. An adsorber switching valve according to claim 1, wherein the driving means is a high torque 28 VDC motor.

8. An adsorber switching valve according to claim 1, wherein the driving means is directly coupled to the spool drive shaft.

9. An adsorber switching valve according to claim 1, wherein the driving means is connected to the spool drive shaft by a plurality of gears.

10. An adsorber switching valve according to claim 1, wherein the spool drive shaft contains a flexible coupling between the valve spools.

11. An adsorber switching valve according to claim 1, wherein the spool drive shaft contains a flexible coupling between valve spools.

12. An adsorber switching valve according to claim 1, wherein each valve housing is provided with a vent opening communicating to a piping connection.

13. An adsorber switching valve according to claim 6, wherein at least one of the valve housing openings communicates to flexible piping.

14. An adsorber switching valve according to claim 3, wherein the sealing means are 0-rings located in 0-ring grooves around each through port.

15. An adsorber switching valve according to claim 14, wherein the 0-rings are 70 durometer or higher.

16. An adsorber switching valve according to claim 1, wherein the valve housings are stacked one on top of another and fixed in place by fastening means.

17. An adsorber switching valve according to claim 16, wherein the fastening means are through bolts.

18. An adsorber switching valve according to claim 1, wherein the valve housings are constructed of two single-piece halves of a split case housing.

19. An adsorber switching valve for directing inlet and outlet streams of air to two adsorber beds, comprising two valve housings each enclosing within them a valve spool cylindrical in shape, said spools being colinearly and axially disposed with respect to each other, each valve spool containing within it two passageways for fluid, each passageway terminating in two through ports on the cylindrical surface of said valve spool; a spool drive shaft colinearly axially disposed with respect to said valve spools and connecting said valve spools; openings in said valve housings located opposite the through ports in the valve spools and communicating to piping to the adsorber beds and to inlet and outlet piping; driving means for rotating said spool drive shaft, thereby rotating the two valve spools simultaneously; means for sealing the valve housing.

20. An adsorber switching valve according to claim 19, wherein the valve housings are cylindrical in shape, each having a top surface and a bottom surface, said valve housings being separated from each other by separating means.

21. An adsorber switching valve according to claim 20, wherein the separating means is a valve spool separator consisting of a hollow cylinder coaxially disposed about the spool drive shaft and disposed between the valve spools, said valve spool separator being fastened to the top surface of one of said valve housings and fastened to the bottom surface of the other of said valve housings.

22. An adsorber switching valve according to claim 21, wherein the means for fastening the flexible shaft to the spool drive shaft is a set screw located in the cylindrical surface of the flexible shaft and engaging a set screw hole in the surface of the spool drive shaft, the valve spool separator having a hole in its cylindrical surface disposed so that it provides access to said set screw for screwdriving means.

* * * * *